(12) United States Patent
Dreesch et al.

(10) Patent No.: US 11,301,689 B1
(45) Date of Patent: Apr. 12, 2022

(54) REAL-TIME CONSUMER GOODS MONITORING

(71) Applicant: Inteladata, LLC, Norwood, MA (US)

(72) Inventors: Robert Dreesch, Norwood, MA (US); Lappin Hammond, Norwood, MA (US)

(73) Assignee: Inteladata, LLC, Norwood, MA (US)

( * ) Notice: Subject to any disclaimer, the term of this patent is extended or adjusted under 35 U.S.C. 154(b) by 182 days.

(21) Appl. No.: 16/595,190

(22) Filed: Oct. 7, 2019

Related U.S. Application Data (60) Provisional application No. 62/741,658, filed on Oct. 5, 2018.

(51) Int. Cl.
| | | |
|---|---|---|
| *H04N 7/18* | (2006.01) | |
| *G06K 9/00* | (2022.01) | |
| *H04N 21/81* | (2011.01) | |
| *G08B 13/196* | (2006.01) | |
| *G06Q 30/02* | (2012.01) | |

(52) U.S. Cl.
CPC ..... *G06K 9/00771* (2013.01); *G06Q 30/0201* (2013.01); *G08B 13/19608* (2013.01); *G08B 13/19641* (2013.01); *H04N 7/181* (2013.01); *H04N 21/812* (2013.01); *G06T 2207/30232* (2013.01)

(58) Field of Classification Search
CPC .......... G06K 9/00771; G06K 2209/21; G06Q 30/0201; G08B 13/19608; G08B 13/19641; H04N 7/181; H04N 7/183; H04N 21/812; H04N 21/23418; H04N 21/44008; G06T 2207/30232; A61B 2034/2065
See application file for complete search history.

(56) References Cited

U.S. PATENT DOCUMENTS

| | | | |
|---|---|---|---|
| 8,091,782 B2 | 1/2012 | Cato et al. | |
| 9,124,778 B1* | 9/2015 | Crabtree | .......... G08B 13/19608 |
| 2007/0254080 A1 | 11/2007 | Schackmuth et al. | |
| 2009/0259571 A1 | 10/2009 | Ebling et al. | |
| 2013/0282624 A1* | 10/2013 | Schackmuth | ........ G01R 19/165 |
| | | | 705/412 |
| 2017/0061625 A1* | 3/2017 | Estrada | ................ G06N 3/0454 |
| 2017/0208652 A1* | 7/2017 | Luckhardt | ............ H04N 5/2256 |
| 2017/0265681 A1* | 9/2017 | Lee | ........................ A47J 37/048 |
| 2019/0069728 A1 | 3/2019 | Alfarra | |
| 2020/0182481 A1* | 6/2020 | Bhogal | ................. A47J 36/321 |

FOREIGN PATENT DOCUMENTS

| | | |
|---|---|---|
| WO | 2008029159 A1 | 3/2008 |
| WO | 2019052929 A1 | 3/2019 |

* cited by examiner

*Primary Examiner* — Eileen M Adams
(74) *Attorney, Agent, or Firm* — Greenberg Traurig, LLP; Roman Fayerberg; Joshua Rudawitz (57) ABSTRACT

In accordance with aspects of the present disclosure, a system of monitoring one or more consumer goods is provided. The system includes at least one monitoring device configured to capture and transmit data about the one or more consumer goods and at least one computing device configured to receive data from the at least one monitoring device, perform analysis on the captured data, and generate one or more notifications or triggers based on the analysis.

26 Claims, 9 Drawing Sheets

REAL-TIME CONSUMER GOODS MONITORING

CROSS-REFERENCE TO RELATED APPLICATION

This application claims priority to, and the benefit of, U.S. Provisional Application No. 62/741,658, filed Oct. 5, 2018, for all subject matter common to both applications. The disclosure of said provisional application is hereby incorporated by reference in its entirety.

FIELD

The present disclosure relates to a real-time monitoring system and method suitable for analyzing consumer goods. In particular, the present disclosure relates to monitoring food items in a consumer setting for item tracking, inventory management, and sales analysis.

BACKGROUND

Generally, consumer goods are not electronically monitored and no automated analysis is provided as to the status of those goods. Traditionally, the only way to monitor the movement of goods is with a physical count done by a human being. When relying on a human for physical counts, the counts are not always consistently executed nor are they always accurate because physical counts are prone to human error. These methods also do not have an automated historical record for how long items have been at a particular location, where and when items have been moved, etc. There is also the additional cost of human capital involved to properly monitor and analyze these goods. Accordingly, there is a need in the consumer food industry, for a method and system for automated monitoring and analysis of consumer items.

SUMMARY

There is a need for improvements for autonomous monitoring and analysis of consumer goods. The present disclosure is directed toward further solutions to address this need, in addition to having other desirable characteristics.

In accordance with aspects of the present disclosure, a method for monitoring one or more consumer goods is provided. The method includes receiving, by at least one sensor device, data related to one or more items located on a grill, performing, by the at least one computing device, analysis on the captured data, generating, by the at least one computing device, one or more notifications or triggers based on the analysis, and outputting, by the at least one computing device, the one or more notifications or triggers.

In accordance with aspects of the present invention, the at least one sensor device is a camera. The camera can be located above a sneeze guard on the grill top. The analysis on the captured data can include implementing a convolutional neural network configured to detect an item of interest from the one or more items. The analysis on the captured data can further include associating metadata with an identification and location for the item of interest. The analysis on the captured data can further include processing the metadata by an object tracking algorithm to calculate location and movement and tagging the item of interest with a universally unique identifier for tracking. The analysis on the captured data can further include recording metadata state changes for the item of interest over time. The analysis on the captured data can include determining at least one of an inventory quantity of a specific good is too high/low, there is no good on display at a location, a good has been on display for too long at a location, a good was removed too soon from a location, a good has not been tended too enough, whether a good is in an incorrect location, the wrong goods are being displayed, and whether a good is safe for the consumer.

In accordance with example embodiments of the present invention, a system of monitoring one or more items on a grill is provided. The system includes a grill top, at least one monitoring sensor device configured to capture and transmit data about one or more items on a grill top, a local computing device configured to receive data from the at least one sensor device, and a remote cloud computing device to receive data from the local computing device. At least one of the local computing device and the remote cloud computing device perform analysis on the captured data, and generate one or more notifications or triggers based on the analysis.

In accordance with aspects of the present invention, the grill top is a roller grill with a sneeze guard. The at least one monitoring sensor device can be a camera located on the sneeze guard above the grill top. The analysis on the captured data can include implementing a convolutional neural network configured to detect an item of interest from the one or more items. The analysis on the captured data can further include associating metadata with an identification and location for the item of interest. The analysis on the captured data can further include processing the metadata by an object tracking algorithm to calculate location and movement and tagging the item of interest with a universally unique identifier for tracking movement of the item of interest.

The movement can be tracked frame by frame by comparing adjacent images from the captured data. The analysis on the captured data can further include recording metadata state changes for the item of interest over time. The analysis on the captured data can include a plurality of data points including at least one of a relative pixel location of an item of interest, pixel representation of an item of interest, distance from an item of interest, and depth of item of interest. The analysis can include determining at least one of an inventory quantity of an item of interest is too high or low, there is no item of interest is on display at a location, an item of interest has been on display for too long at a location, an item of interest was removed too soon from a location, an item of interest has not been tended too enough, an item of interest is in an incorrect location, a wrong an item of interest is being displayed at a location, and whether an item of interest is safe for a consumer. The analysis can include determining at least one of monitor a number of items, type of items, physical location of items, temperature of items, physical movement of items, time of physical movement of items, color of items, dwell time of items in a single location, physical appearance items, safety related protocols, and whether the item is no longer detectable.

In accordance with example embodiments of the present invention, a computer program product for providing advertisements, the computer program product includes a computer readable storage medium having program instructions, the program instructions readable/executable by a computing device to cause the computing device to receive data related to one or more items located on a grill, perform analysis on the captured data, generate one or more notifications or triggers based on the analysis, and output the one or more notifications or triggers.

BRIEF DESCRIPTION OF THE FIGURES

The present disclosure is further described in the detailed description which follows, in reference to the noted plurality of drawings by way of non-limiting examples of exemplary embodiments, wherein.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

An illustrative embodiment of the present disclosure relates to a method and system configured to monitor consumer goods, performs analysis on the monitored goods, then triggers events, generate reports and notifications that enable the optimization of business processes for entities involved in the supply change (manufacturers, logistics providers, retail organizations, etc.).

FIGS. 1A through 7, wherein like parts are designated by like reference numerals throughout, illustrate an example embodiment or embodiments of improved operation for real time and monitoring of consumer goods, according to the present disclosure. Although the present disclosure will be described with reference to the example embodiment or embodiments illustrated in the figures, it should be understood that many alternative forms can embody the present disclosure. One of skill in the art will additionally appreciate different ways to alter the parameters of the embodiment(s) disclosed, such as the size, shape, or type of elements or materials, in a manner still in keeping with the spirit and scope of the present disclosure.

Figure 1A:
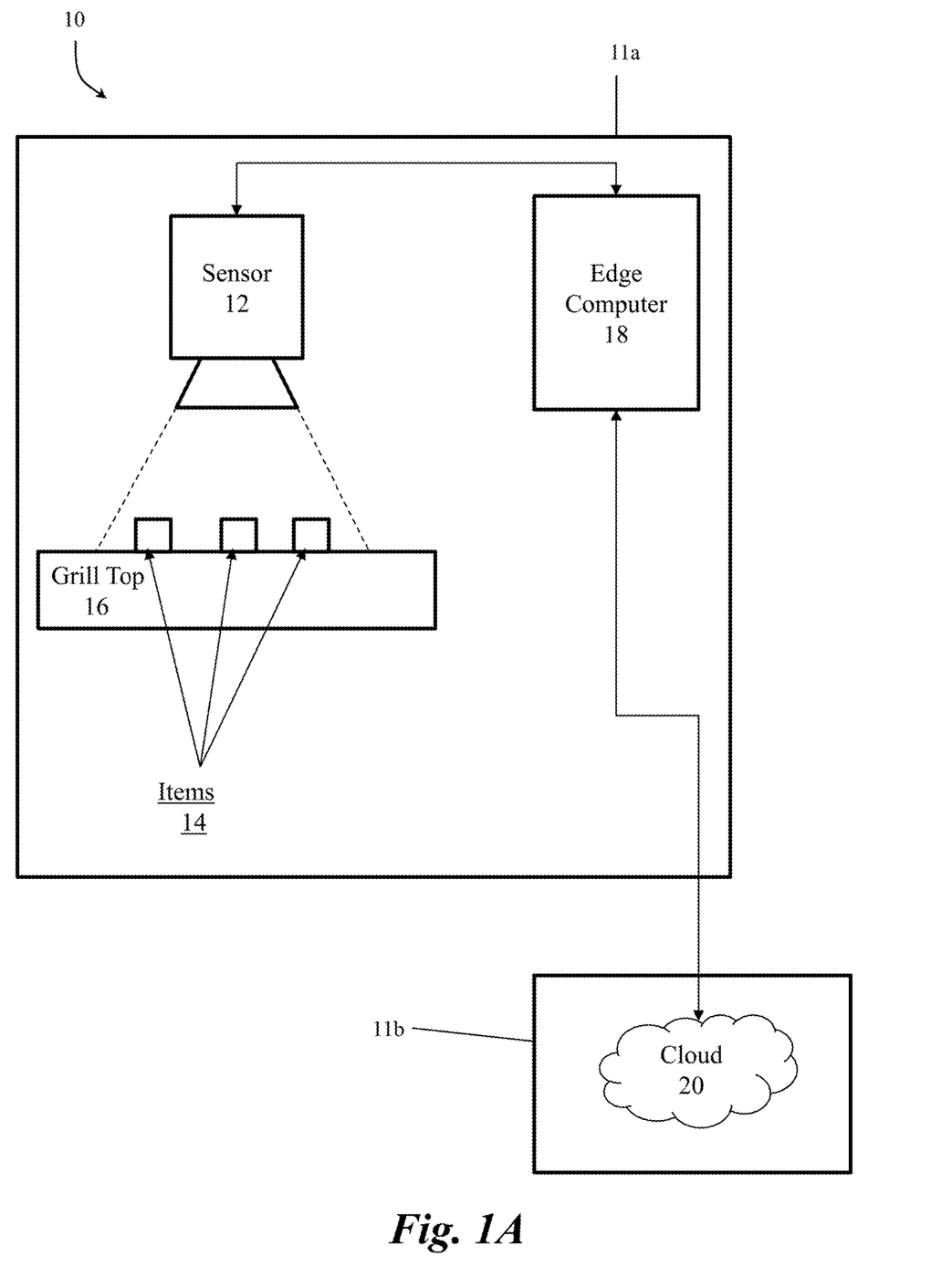
FIGS. 1A, 1B, and 1C are exemplary system architectures for implementing the present disclosure.

In reference to FIG. 1A, in some embodiments, the system 10 can include two main architectural components. First, the system can include an edge system component 11a including one or more sensors and local computer 18 that monitors items 14, such as consumer goods, at the consumer location, and can perform analysis and sends data to a remote component 11b. The computer 18 can run custom Artificial Intelligence software that performs real-time detection, identification and movement tracking of all of the items on a grill top 16. The grill top 16 can include any combination of grills, for example, a roller grill, a skillet top grill, etc. The system 10 can also be adapted to work with any combination of applications, such as an oven, shelves, refrigerators, etc. The computer 18 can be designed to monitor the surface of the grill top 16 via external sensors, such as a camera. The sensors can include any combination of sensors that provide observation data to the computer 18. For example, the sensors 12 can include, but are not limited to cameras, infrared cameras, infrared thermometers, motion sensors, pressure sensors, mobile phone applications, etc. The computer 18 can receive and processes real-time sensor data from the combination of sensors and perform multiple object detection and object tracking of items 14 on the grill top 16.

In some embodiments, the system 10 can have different modes of operation. For example, the system 10 can have a grill operation mode and a maintenance mode. The grill operation mode can include observing the grill and the items 14 thereon (e.g., prepping, cooking, etc.) during a day. The maintenance mode can include observing when a grill is being maintained (e.g., grill maintenance, cleaning, repairing, etc.). The observations and analysis can vary depending on which mode the system 10 is operating within. The difference in the modes comes in how the data derived from each mode is interpreted. Maintenance mode would typically indicate employee interaction while operation mode would indicate the course of typical untended operations.

In some embodiments, a set of metadata can be used to record the state information (e.g., the "grill state") based on the observation data. The metadata can include state information for all items 14 of interest and any changes that occur to the items 14. For example, grill state changes can include, but are not limited to, a number of items 14 on the grill top 16, locations of the items 14 on the grill top 16, changes to items 14 location/orientation, a number of movements of the items 14, the type of item 14, location and time item 14 is initially detected, location and time when item 14 moves, location and time when item 14 is no longer detectable, items 14 temperature, items 14 appearance (e.g., coloring), dwell time in location for an item 14, etc. The computer 18 can constantly be receiving and analyzing observation data such that the grill state change over time.

In some embodiments, the system 10 can include a remote system component 11b that receives relevant data from the edge system component 11a for further analysis. For example, the grill state metadata can be sent to the remote system component 11b for further processing. In some embodiments, the state metadata can be sent to the remote system component 11b for further processing or it can be preprocessed by the computer 18 before being sent. The preprocessing can include implementing a combination of artificial intelligence and machine learning algorithms to cleanse and improve data quality, for example, by removing false detections and other anomalies that occur during the sensor monitoring of the grill. In some embodiments, the computer 18 can send raw image data and all the processing and analysis can be performed by the remote system component 11b.

Regardless of the computing device performing the analysis on the items 14, the system 10 can perform detection and tracking of multiple items 14. Initially, one or more sensors 12 can obtain data related to the grill top 16 and the items 14 thereon. For example, a sensor 12 can be used to capture images/frames of the overall grill top 16. Once data is obtained from the sensors, a combination or artificial intelligence and machine learning algorithms can be applied to identify all objects of interest, for example, using a convolution neural network. Once identified, metadata can be assigned to each identified item 14, for example, relative item 14 location and appearance. In some embodiments, each of the items 14 can be assigned a unique identifier and timestamp reflected the initial detection. The metadata information, unique identifier, and timestamp can be stored remotely (e.g. in the cloud 20) and/or locally (e.g., on the computer 18) for future use. After the items 14 have been detected, identified, and tagged with a unique identifier, each item 14 can be tracked and recorded. For example, using image data, item 14 movement can be tracked and recorded frame by frame (i.e., image by image). By comparing adjacent images, each time that an item 14 movement is detected, the movement can be recorded, a new location can be recorded, and a timestamp can be generated for associating with that item 14.

The grill state changes can be stored in one or more databases for processing by the remote device or system 11b. The remote device or system 11b can implement a combination of artificial intelligence and machine learning algorithms to cleanse and improve data quality, for example, by removing false detections and other anomalies that occur during the sensor monitoring of the grill. The artificial intelligence and machine learning algorithms can also be used to generate various analytics. Examples of analytics include but are not limited to both operational and sales related outputs. Examples of operational analytics include calculating and/or deriving a length of time items are on the grill, frequency of grill maintenance, food quality of items on the grill, and movement of items on the grill for merchandising analysis. Examples of sales related analytics include time of sales, itemization of sales, market basket data analytics, and location of product on the grill. These analytics can be derived by extracting and categorizing the data to identify and analyze behavioral patterns and data.

In some embodiments, the remote system component 11b can be a cloud computing infrastructure 20. The software application running in the cloud computing infrastructure 20 can receive data from the edge component 11a then perform analysis, trigger events, generate reports and send notifications.

In some embodiments, the cloud 20 can provide feedback and/or commands to the computer 18 and/or other devices. For example, the cloud 20 can issue command and control messages, for example, change grill operation mode, modify software algorithm mode, update the computer software, etc. In some embodiments, the cloud 20 can trigger external events through the identification of arbitrarily defined changes to received and/or algorithmically generated data. Examples of external events include, but are not limited to dynamic report generation, text messages, mobile app notifications, emails, telephone calls, audio/visual cues (e.g., light indicator, audible alarm, etc.).

Figure 1B:
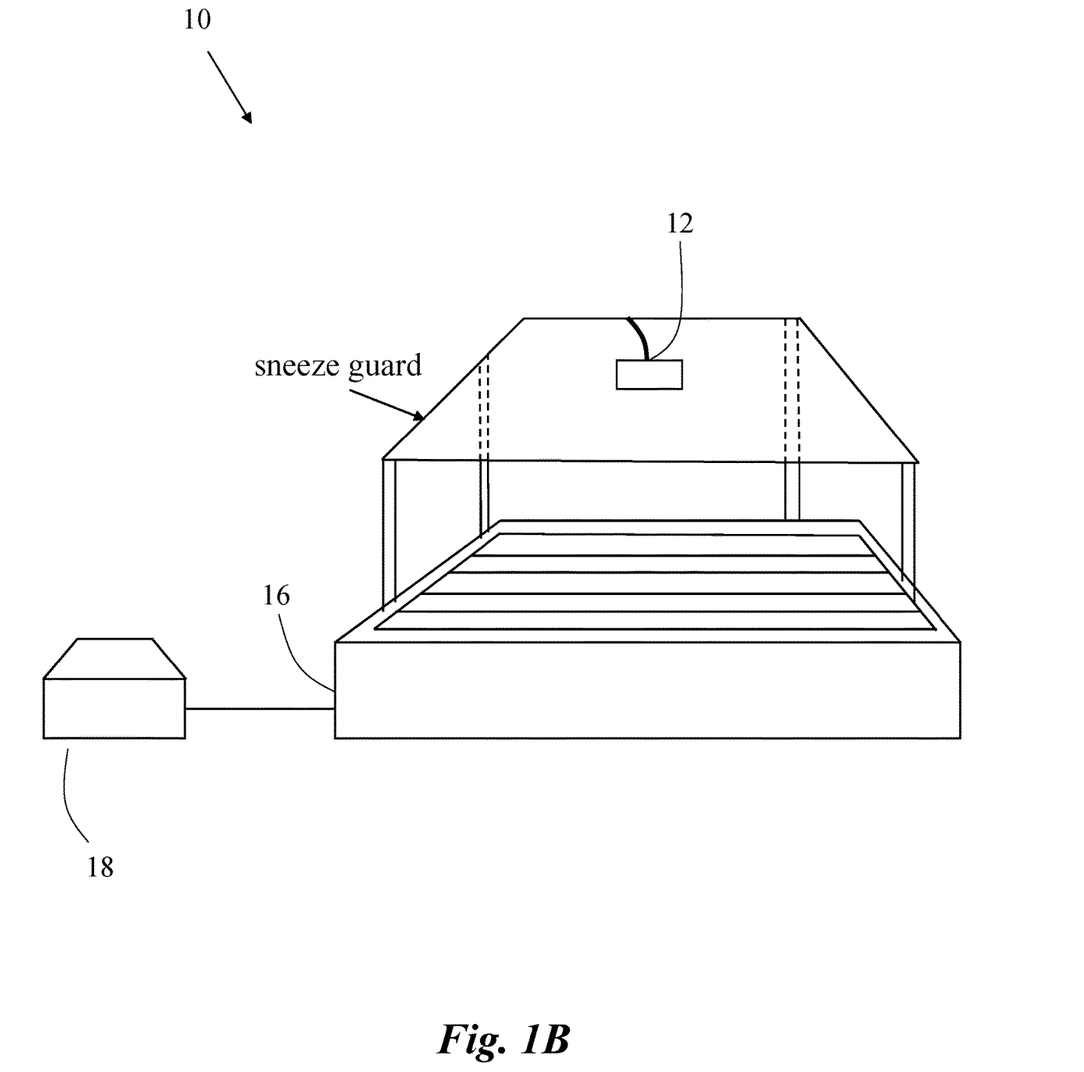
Figure 1C:
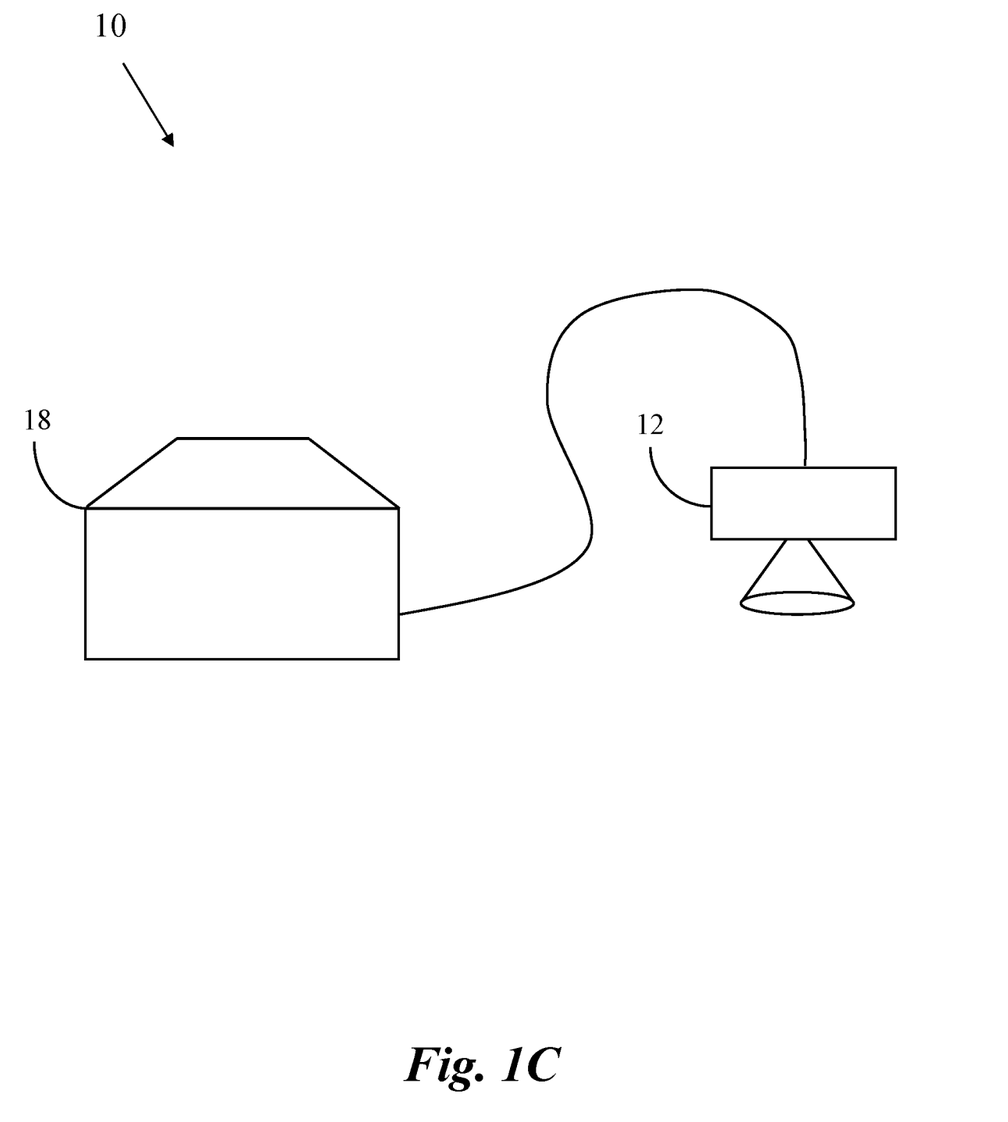

FIGS. 1A, 1B, and 1C depict illustrations of example embodiment edge computing systems 10 at a consumer location selling food items. In particular, FIG. 1A depicts a system 10 including a video sensor 12 configured to capture data related to food items 14 located on a grill top 16. In some embodiments, the sensor 12 can be configured with camera vision technologies. The video sensor 12 can also be configured to transmit the monitored food items 14 to a local edge computer 18 for additional processing. In some embodiments, the local edge computer 18 can be configured to monitor and perform analysis on the food items 14, based on the captured data from the video sensor 12. For example, the local edge computer 18 can utilize a combination of artificial intelligence, neural networks, machine learning, etc. to analyze the monitored food items 14. In some embodiments, system 10 can be integrated with external enterprise systems through APIs (e.g. ERP, CRM, etc.). In some embodiments, the video sensor 12, the edge computer 18, and the communication interfaces therebetween can be incorporated into the grill top 16 itself as a single commercial unit. Any of the analysis and/or processing steps discussed with respect to computer 18 can also be performed by the cloud 20 and vice versa, depending on user preferences.

In some embodiments, the local edge computer 18 can be configured to transmit the monitored food items 14 to a cloud computing infrastructure 20 for additional analysis. When sensor data, for example raw image data, is received by the local computer, it can be processed by convolutional neural networks to detect objects of interest and their relative physical locations. The neural network output can then be processed by an object tracking algorithm to calculate location and movement. The output of the object detection algorithm can then be processed by a data management algorithm to perform myriad operations including, but not limited to, removal of errant data. The data is then sent to the cloud for further processing.

In some embodiments, the cloud computing infrastructure 20 can be configured to monitor and perform analysis on the food items 14, based on the captured data from the sensor 12. For example, the cloud computing infrastructure 20 can utilize a combination of artificial intelligence, neural networks, machine learning, etc. to analyze the monitored food items 14. In some embodiments, the combination of artificial intelligence, neural networks, machine learning can be used to determine the type and location of item 14 of interest through the use of state-of-the-art neural networks including, but not limited to convolutional neural networks. The end result can be a unique set of metadata that includes, but is not limited to, the location and type of item 14.

FIG. 1B depicts another illustrative view of the system 10 discussed with respect to FIG. 1A. In particular, FIG. 1B depicts the system 10 with the video sensor 12, the edge computer 18, and the communication interfaces therebetween as separate components from the grill top 16. For example, the video sensor 12, the edge computer 18, and the communication interfaces therebetween can be retrofitted to an existing grill top 16. In some embodiments the edge computing device 18 (or grill monitoring computation device) can be integrated with the sensor 12, as depicted in FIG. 1C. Regardless of implementation, the communication interfaces between the different components can include any combination of communication interfaces known in the art. For example, the video sensor 12, the edge computer 18, etc. can communication over a combination of wired and wireless communication mediums without departing from the scope of the present disclosure, including, but not limited to cellular, Wi-Fi, Bluetooth, microwave, satellite wireless communications networks, visual spectrum wireless networks, wired ethernet networks, powerline communication networks, etc.

In some embodiments, the edge computing system 10 can capture data related to the physical movement of the items 14 being monitored. For example, the sensors 12 can capture data, including but not limited to when an item 14 is added or removed from a location, how many times a particular item 14 has been moved over a period of time, how long a particular item 14 has remained at a particular location without being moved (e.g., on display), the temperature of a particular item 14, a geographic location of a particular item 14, the time of the item 14 movement, etc. The data being captured can depend on the type of sensors 12 attached to the computer 18, for example, a camera, infrared camera, ambient temperature thermometer, infrared thermometer, etc. The data can be treated differently depending on the type of data being captured. For example, in the case of a camera, the data received can be raw image data and can processed with a set of software algorithms that include, but are not limited to, neural networks and proprietary multiple object tracking algorithms that assign a universally unique identifier to a detected item 14. The unique identifier allows the system to record and maintain item 14 metadata state changes over time. For example, if the item 14 of interest is physically moved (e.g., by a human), the item 14 tracker detects the movement and updates the location in storage with a corresponding time. This can be used to establish a history of movement for each identified and tagged item. The system 10 can be configured to monitor a variety of items 14 at a consumer location. For example, it can monitor and track burgers, hot dogs, pizzas, candy, cigarettes, etc.

In some embodiments, the edge computing system 10 and/or cloud computing infrastructure 20 can perform some combination of real-time and historical data analysis. For example, the edge computing system 10 and/or cloud computing infrastructure 20 can utilize a combination of real-time data and historical data about consumer items 14 to perform predictive analysis, product state identification, identify trends, etc. The real-time and historical data analysis can trigger events for the detection of various parameters (e.g., product states, temperature, inventory count, geographical location, retail store ID, time of day, time of year, etc.) that have been defined within the system 10. The parameters that trigger events vary based on the pre-defined event type. For example, in a consumer setting, events that can be triggered, can include but are not limited to, an inventory quantity of a specific item 14 is too high/low, there is no item 14 on display at a location, an item 14 has been on display for too long at a location, an item 14 was removed too soon from a location, an item 14 has not been tended too enough, an item 14 is in an incorrect location, the wrong item 14 are being displayed, etc. In some embodiments, the events are triggered based on predetermined established rules that are coded as software algorithms. For example, the system 10 can compare the length of time an item 14 has been tracked by the multiple object tracking algorithm with a previously defined acceptable duration and if the duration exceeds the time duration defined, an event can be triggered. Further examples of rules include the quantity of a particular item on the grill 16 and can identify triggers when the quantity of items 14 are too low or too high. An event can be triggered to alert those responsible for restocking the grill 16 to properly stock the grill 16 to a predetermined quantity. Another example is the identification of item 14 in the wrong location on the grill. Item 14, based on analytics, sells best when located in a specific location on the grill. A location event can be triggered to alert a clerk to remerchandise the grill 16 to provide the best opportunity for item 14 to realize maximum sales potential. Similar rules can be implemented for the different events triggers discussed herein.

In some embodiments, triggered events can include a generating reports or notifications. The reports or notifications can include data related to the optimization and management of items 14 throughout a location. Optimizations can be determined by combining domain expertise with an algorithm to maximize efficiencies and leverage operational best practices. The user can receive the information in a form including but not limited to dynamic report generation, text messages, mobile app notifications, emails, telephone calls, audio/visual cues (e.g., light indicator, audible alarm, etc.).

Figure 2:
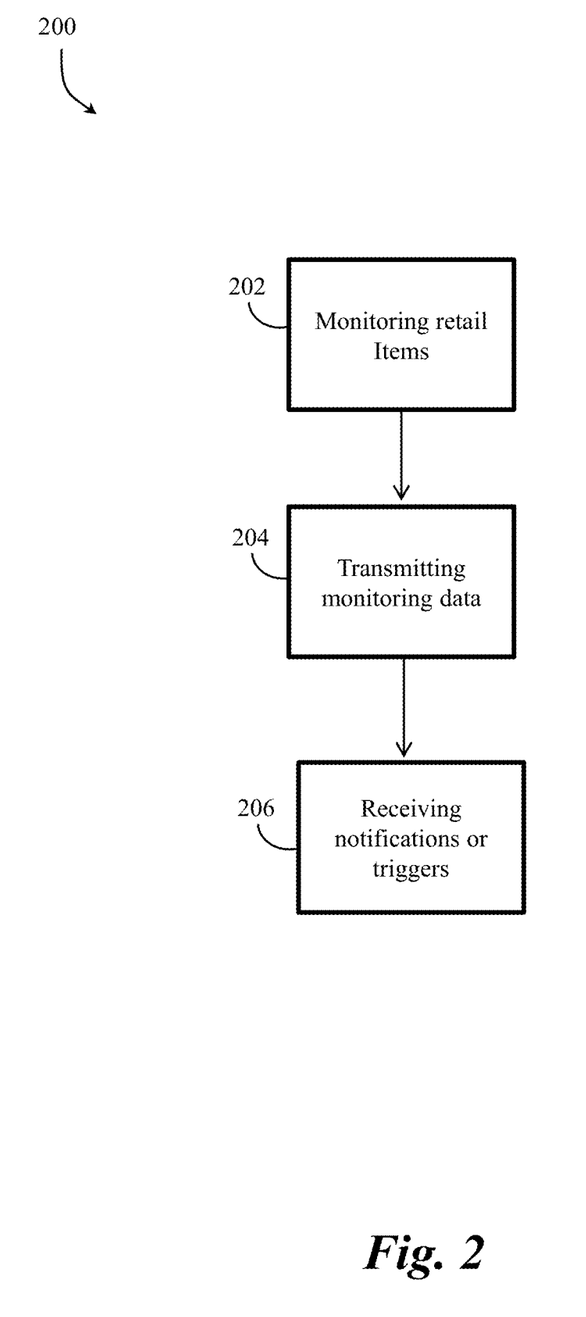
FIG. 2 is an exemplary flow chart for a process of operating the present disclosure.
Figure 3:
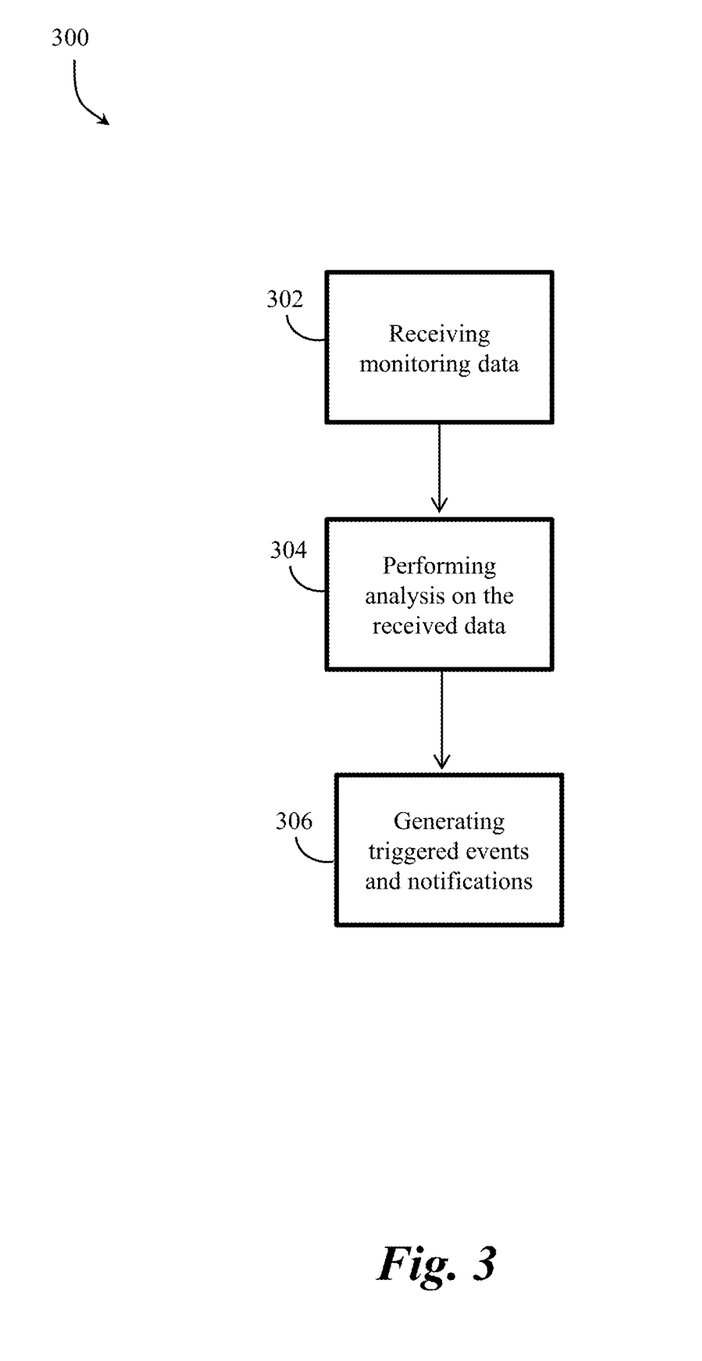
FIG. 3 is an exemplary flow chart for a process of operating the present disclosure.

FIGS. 2 and 3 show exemplary flow charts depicting implementation of the present disclosure.

Figure 6:
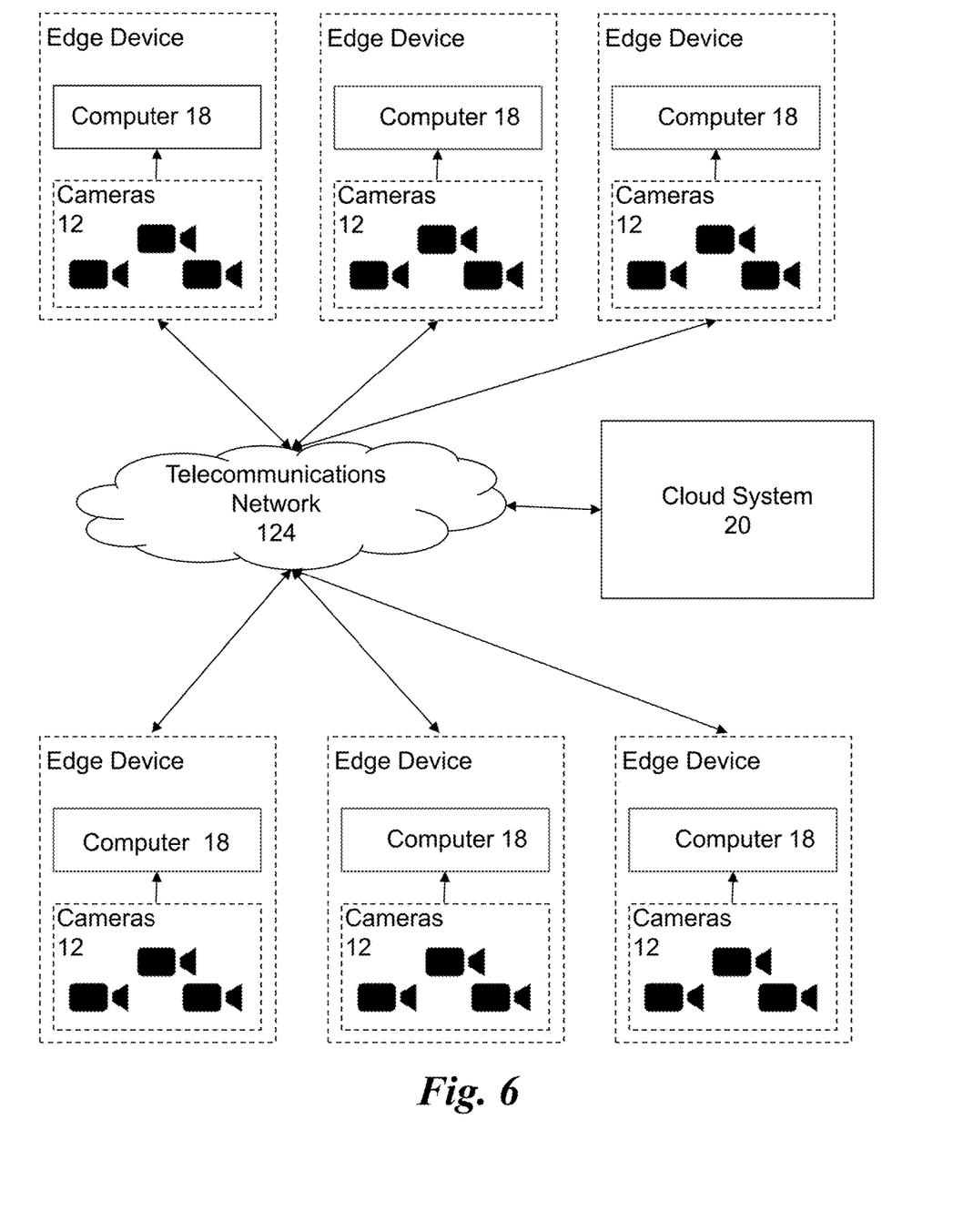
FIG. 6 is an exemplary network architecture for implementing the present disclosure.

FIG. 2 depicts an exemplary flow chart showing the operation of the edge system 10 and consumer goods analysis system 100, as discussed with respect to FIGS. 1 and 6. In particular, FIG. 2 depicts a process 200 for locally monitoring item 14 (e.g., consumer goods) at a retail location. At step 202 the items 14 are monitored using a sensor device 12 (e.g., a video camera). At step 204 the monitoring data is transmitted to a local edge computer 18 for analysis. Step 204 can include implementing a unique combination of calculations and algorithms that share results to ultimately produce a customized output to help the user be more efficient/effective at their work station. For example, the process 200 can be used to assist in waste reduction by helping store operators put out optimized quantity and type of products based on historical analytics maintained by the software, better freshness of food by ensuring food items are not left on the grill beyond the time they are intended to be consumable, and improved sales by providing reports based on historical and real-time data that informs a store operator optimal times specific food items should be placed on the grill for consumers.

For example, when sensor data, such as raw image data, is received by the local computer 18, it is processed by a set of algorithms that include, but are not limited to, convolutional neural networks configured to detect object of interest (e.g., as defined in an object database) and their relative physical locations, proprietary multiple object tracker algorithms, etc. When implementing a convolutional neural network, the output of the neural network can include a unique set of metadata that includes, but is not limited to, the location and type of items 14. The neural network output is then processed by an object tracking algorithm to calculate location and movement and assign a universally unique identifier to a detected items 14. The use of the unique identifiers allows the system 10 to record and maintain item 14 metadata state changes for each identified and tagged item 14 over time. For example, if the item 14 of interest is physically moved by a human, the object tracker detects the movement and updates the location being internally stored and maintained by the algorithms.

The output of the object detection algorithm can then be processed by a data management algorithm to perform myriad operations including, but not limited to, removal of errant data. The data is then sent to the cloud 20 for further processing. For example, the data can be further processed on the local computer 18 and sent to the cloud 20 processing system where software algorithms that embody predefined rules determine what events should occur. These events can be triggered based on predetermined established rules that are coded within the combination of algorithms. An example is to compare the length of time an item 14 has been tracked by the multiple object tracking algorithm with a previously defined acceptable duration. If the duration exceeds the time duration defined, an event can be triggered. Types of events triggered include, but are not limited to generation of reports, emails, phone calls, text messages, mobile app notifications, audio and visual cues (light indicator, audible alarm, etc.). At step 206 notifications and/or triggers are received based on the transmitted monitoring data. For example, a user can receive a text message alert that an item has been sitting in a single location too long and should be moved and/or discarded.

FIG. 3 depicts an exemplary flow chart showing the operation of the items 14 analysis system 100, as discussed with respect to FIGS. 1A, 1B, 1C, 5, and 6. In particular, FIG. 3 depicts a process 300 for analyzing data at a remote location (e.g., cloud) related to items 14 monitored by an edge system 10 at a consumer location. At step 302 monitoring data for the items 14 is received (e.g., from a consumer store). At step 304 the analysis is performed on the received monitoring data. At step 306 notifications and/or triggers are generated based on the analysis and transmitted to the consumer location. In some embodiments, process 200 and 300 can be performed by the same computing device (e.g., a local edge computing device).

In some embodiments, the process 200 in combination with process 300 can be implemented using the sensor 12 at a consumer location to monitor and analyze items 14 at that location (step 202). The sensor 12 can be configured to monitor a plurality of data points for items 14 within view. Examples of data points include, but are not limited to, relative pixel location of an item 14 of interest, pixel representation of an item 14 of interest (e.g., RGB, NIR, time-of-flight image data, etc.), distance from items 14, depth of items 14, etc. Using these data points, for example, the sensor 12 can monitor a number of items, type of items 14, physical location of items 14, temperature of items 14, physical movement of items 14, time of physical movement of items 14, color of items 14, dwell time of items 14 in a single location, physical appearance items, safety related protocols, whether the item 14 is no longer detectable, the grill operation mode, etc.

The sensor 12 can continuously capture and send video frames to a camera vision library on the local edge computer 18. Thereafter, the local edge computer 18 can resizes the image, performs some parameter optimizations on the raster data and passes the video frame to the artificial intelligence (AI) inferencing module 116. Examples of parameter optimizations can be customized based on sensor type, for example, an RGB camera can include optimizations for resizing of images, cropping of images, color space modifications, pixel manipulation, white balance manipulation, etc. The AI inferencing module 116 can be located on the local edge computer 18 or the cloud computing infrastructure 20. For example, the data can all be processed locally by the local edge computer 18, it can be sent to the cloud computing infrastructure 20 for processing, or a combination thereof. When data is sent to the cloud computing infrastructure for processing the data can be sent to it over the internet and results can be sent data back to the local edge computer 18. The data can be processed for security before being sent over the internet, for example, data can be encrypted, compressed, etc. In some embodiments, the data can be sent to a mobile computing device of a user (e.g., via SMS text messages, push notifications, etc.). For example, if processing is performed on the cloud infrastructure 20, then a response can be sent to the edge system 10, a response can be sent to a mobile computing device, a response can be sent to another remote device (e.g., administrator, management, etc.), or a combination thereof.

The AI inferencing module 116 receives the video frames from the camera vision library and processes the video with artificial intelligence software based on neural networks and outputs prediction data. The prediction data can identify the type and quantity of items 14 (e.g., consumer goods) it detects, which can then be passed to the camera vision tracking module 118. The prediction data can include, but is not limited to, the type of item 14 and it's relative pixel location.

The camera vision tracking module 118 can receive the video frame, the prediction data and item descriptions from the AI inferencing module 116 and execute an algorithm that detects any change of physical location of the detected items, then pass the resulting data to a data manager module 120. The analysis being performed can include but are not limited to, an inventory quantity of a specific good are too high/low, there is no good on display at a location, a good has been on display for too long at a location, a good was removed too soon from a location, a good has not been tended too enough, a good is in an incorrect location, the wrong goods are being displayed, is the good safe for the consumer, etc. In some embodiments, the analysis can be performed by a combination of algorithms that encode operational rules defined by a domain expert. The data manager module 120 then decides how to treat the data based on the software configuration at the local edge computer 18 (e.g., user preferences). For example, the software configuration can define what types of reports should be generated, what types of events should be triggered, what types of notifications should be sent, to what, where and who notifications should be sent.

Figure 4:
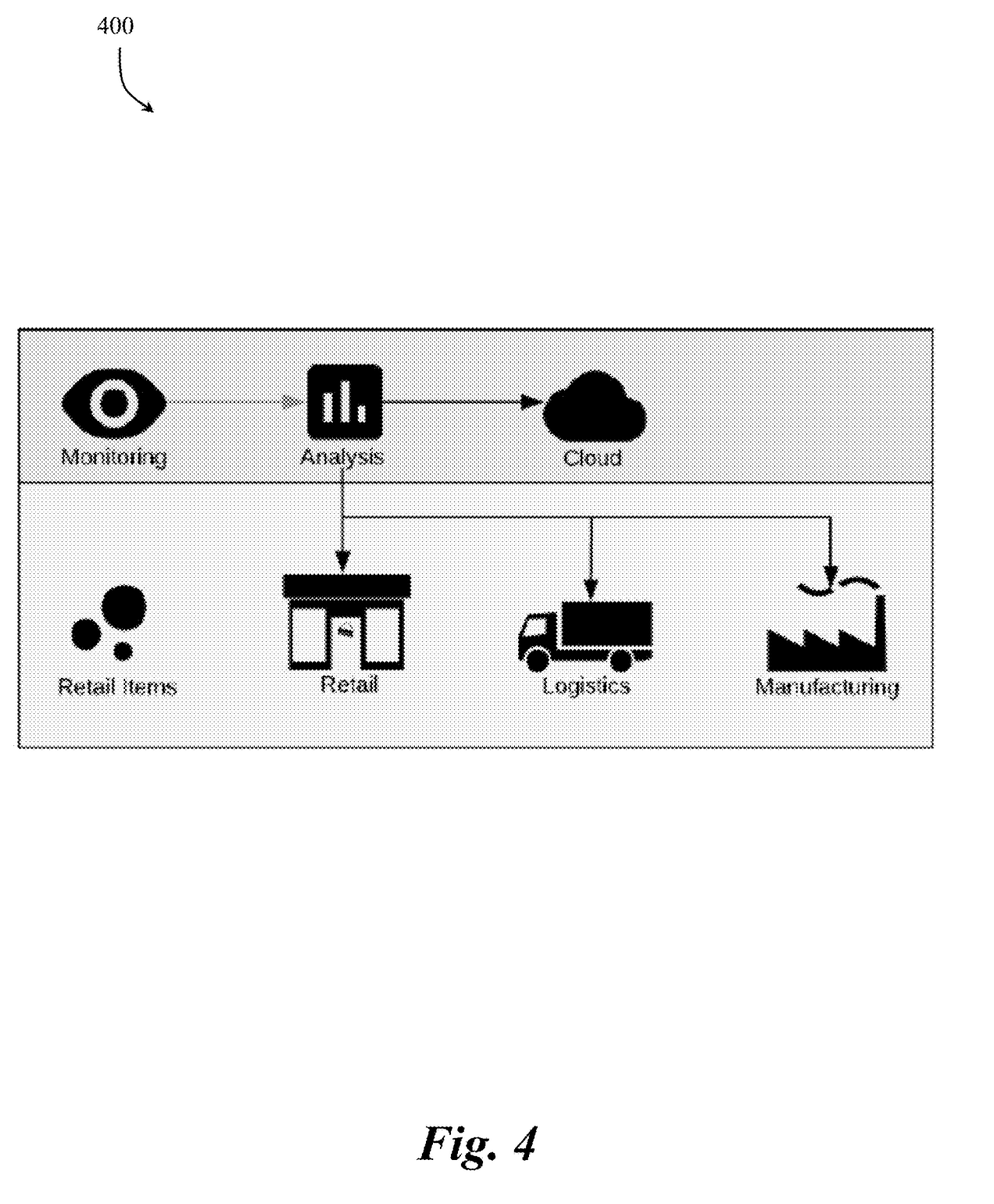
FIG. 4 is an exemplary flow of operations in accordance with the present disclosure.

FIG. 4 depicts a flow of operations 400 in accordance with an example embodiment of the present disclosure. The results of the processes 200 and 300 can be configured to make real-time changes to supply chain systems to, for example, order less/more of a product without requiring human intervention/interaction, provide events, reports, notifications and data to various types of organizations in the supply chain. The organizations in the supply chain can include, but are not limited to manufacturers, logistics providers, retail organizations, etc. Examples of business optimizations for include, but are not limited to more efficient management of available inventory, just-in-time logistics (order more frequently, but more accurately), reduce waste, increase sales, optimize product mix, optimize daypart sales for items, accurate monitoring of employee engagement. For example, if 12 items 14 have been detected on the grill 16 and the system 10 previously identified 24 of those same items 14 in inventory, then it can determine that only 12 of those items 14 remain and more should be ordered. Business optimizations can be achieved through data analysis performed by software algorithms that encode operational rules defined by a domain expert.

Figure 5:
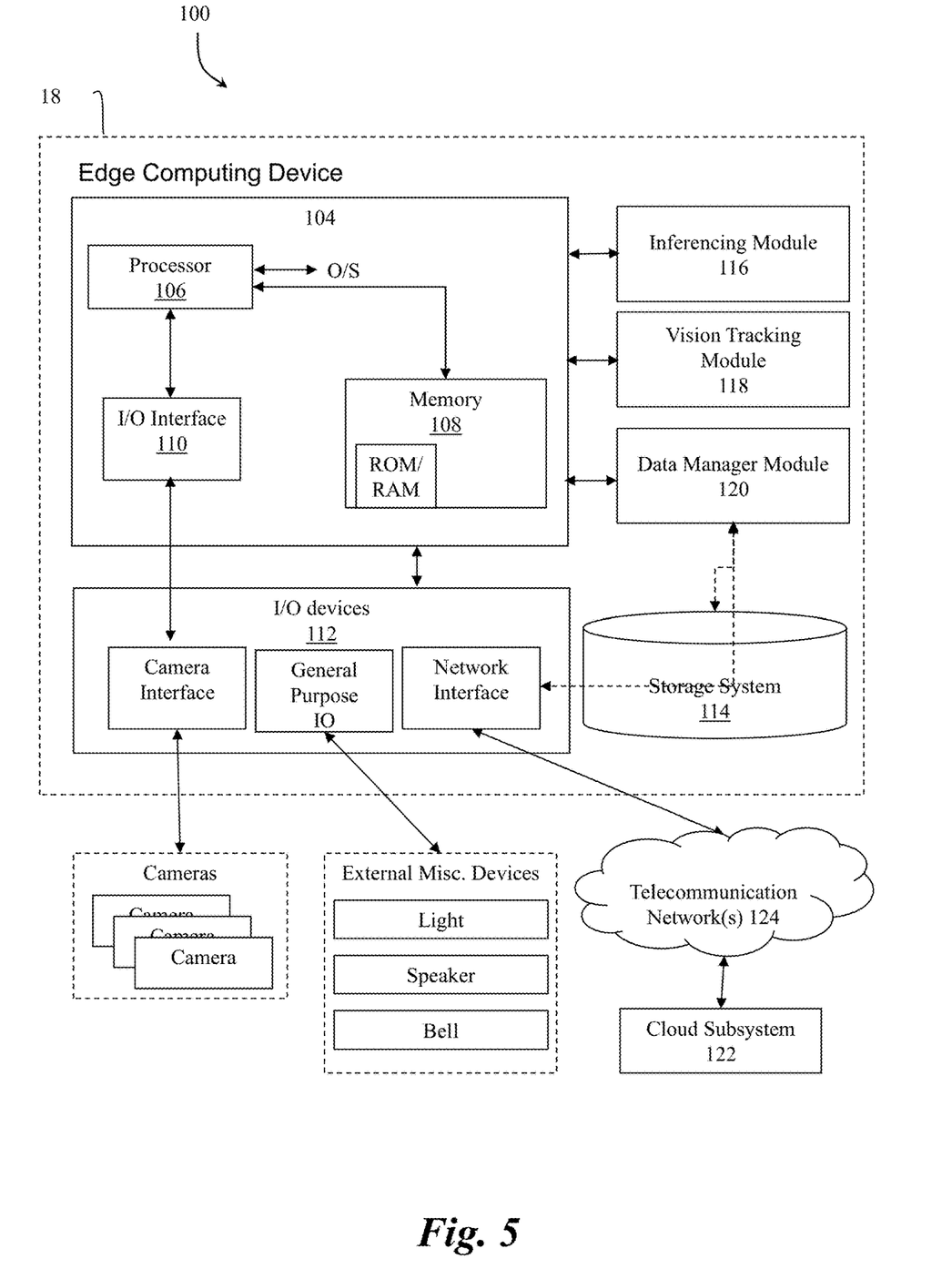
FIG. 5 is an exemplary system architecture for implementing the present disclosure.

The present disclosure can be adapted for monitoring any combination of goods using any combination of monitoring devices, such that it is not intended to be limited to the system of FIG. 1A and/or use with a grill. For example, the system of the present disclosure can be used to monitor consumer goods throughout a facility (e.g., on shelves, entering exiting storage, etc.). FIG. 5 depicts an illustrative system 100 for implementing the steps in accordance with the aspects of the present disclosure. In particular, FIG. 5 depicts a system 100 including a consumer goods analysis system 100. In accordance with an example embodiment, the consumer goods analysis system 100 is a combination of hardware and software configured to carry out aspects of the present disclosure. In particular, the consumer goods analysis system 100 can include a computing system with specialized software and databases designed for providing a method for analyzing monitored consumer goods. For example, the consumer goods analysis system 100 can be software installed on a computing device 104, a web based application provided by a computing device 104 which is accessible by computing devices (e.g., the edge devices 18), a cloud based application accessible by computing devices, or the like. The combination of hardware and software that make up the consumer goods analysis system 100 are specifically configured to provide a technical solution to a particular problem utilizing an unconventional combination of steps/operations to carry out aspects of the present disclosure. In particular, the consumer goods analysis system 100 is designed to execute a unique combination of steps to provide a novel approach to monitor and analyze consumer goods. All the components of 100 can be included into a single integrated unit or can be a combination of separate components communicatively attached to one another.

In accordance with an example embodiment of the present disclosure, the consumer goods analysis system 100 can include a computing device 104 having a processor 106, a memory 108, an input output interface 110, input and output devices 112 and a storage system 114. In some embodiments, the input and output devices 112 can include a camera interface, a general-purpose input output and a network interface. The camera interface can be configured to send and receive data between the edge computing device 18 and one or more camera devices. The general-purpose input output can be configured to send and receive data between the edge computing device 18 and one or more external miscellaneous devices. External miscellaneous devices, for example, can include a light, speaker, bell, etc. The network interface can be configured to send and receive data between the edge computing device 18 and devices over a telecommunication network 124. For example, the network interface can communicate with a cloud subsystem 20 over the telecommunication network 124.

Additionally, the computing device 104 can include an operating system configured to carry out operations for the applications installed thereon. As would be appreciated by one skilled in the art, the computing device 104 can include a single computing device, a collection of computing devices in a network computing system, a cloud computing infrastructure 20, or a combination thereof. Similarly, as would be appreciated by one of skill in the art, the storage system 114 can include any combination of computing devices configured to store and organize a collection of data. For example, storage system 114 can be a local storage device on the computing device 104, a remote database facility, or a cloud computing storage environment 20. The storage system 114 can also include a database management system utilizing a given database model configured to interact with a user for analyzing the database data.

Continuing with FIG. 5, the consumer goods analysis system 100 can include a combination of core components to carry out the various functions of the present disclosure. In accordance with an example embodiment of the present disclosure, the consumer goods analysis system 100 can include a combination of modules to carry out the functionality of the present disclosure. As would be appreciated by one skilled in the art, the modules can include any combination of hardware and software configured to carry out the various aspects of the present disclosure.

In accordance with an example embodiment of the present disclosure, the system 100 can include a plurality of edge devices 18 configured to communicate with the consumer goods analysis system 100 over a telecommunication network(s) 124. The consumer goods analysis system 100 can act as a centralized host, for the edge devices 18, providing the functionality of the modules, sharing a secured network connection. As would be appreciated by one skilled in the art, the plurality of edge devices 18 can include any combination of computing devices, as described with respect to the consumer goods analysis system 100 computing device 104. For example, the computing device 104 and the plurality of edge devices 18 can include any combination of servers, personal computers, laptops, tablets, smartphones, etc. In accordance with an example embodiment of the present disclosure, the computing devices 104, 18 are configured to establish a connection and communicate over telecommunication network(s) 124 to carry out aspects of the present disclosure. As would be appreciated by one skilled in the art, the telecommunication network(s) 124 can include any combination of known networks. For example, the telecommunication network(s) 124 may be combination of a mobile network, WAN, LAN, or other type of network. The telecommunication network(s) 124 can be used to exchange data between the computing devices 104, 18, exchange data with the storage system 114, and/or to collect data from additional sources.

FIG. 6 depicts an exemplary network architecture in which a plurality of edge devices are communicatively attached to a centralized cloud subsystem 20. In some embodiments, the cloud subsystem 20 provides analysis and optimizations for all of the attached edge devices 18.

Figure 7:
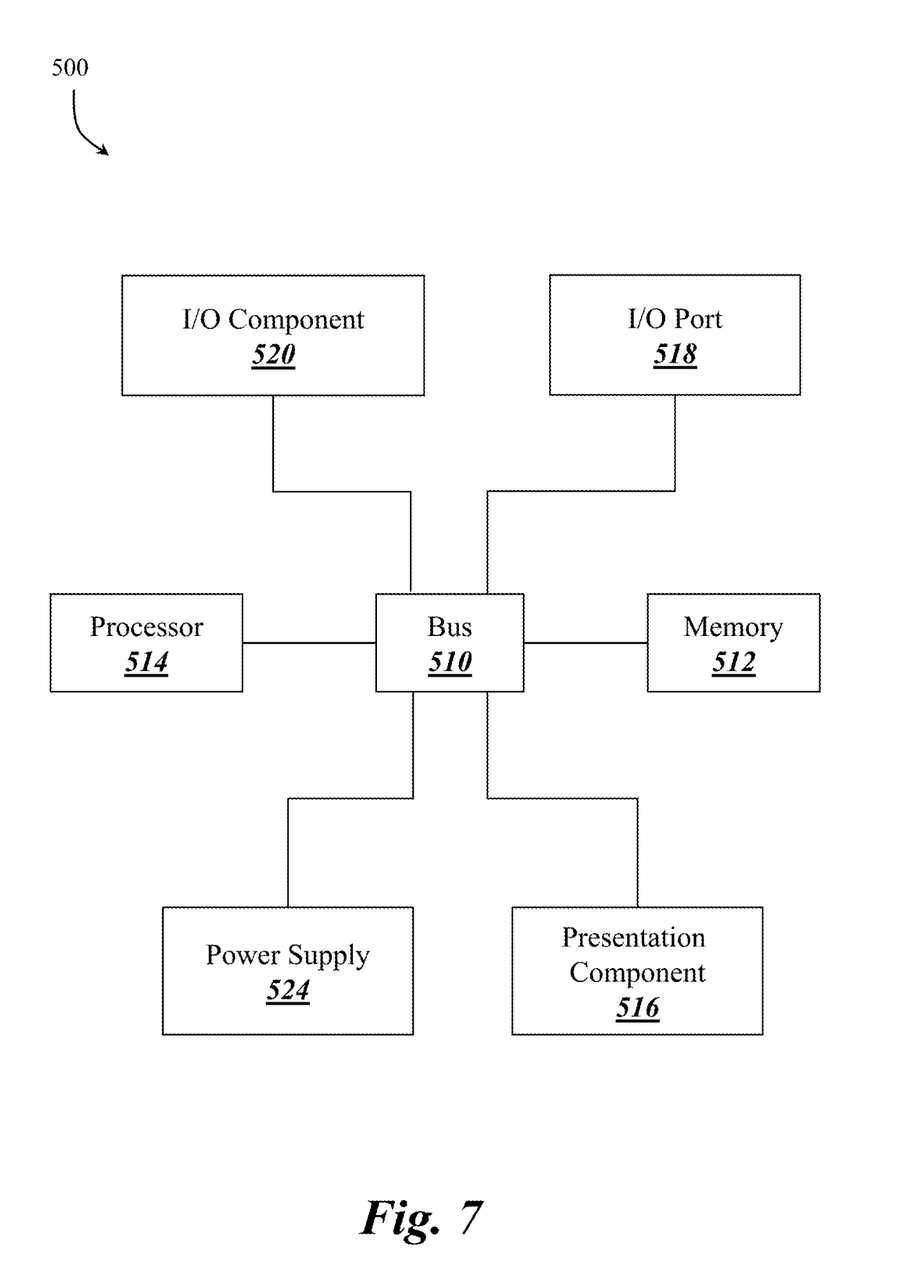
FIG. 7 is an example computing architecture for use in the present disclosure.

Any suitable computing device can be used to implement the computing devices 12, 18, 20, 100, 20 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 500 is depicted in FIG. 7. The computing device 500 is merely an illustrative example of a suitable computing environment and in no way limits the scope of the present disclosure. A "computing device," as represented by FIG. 7, can include a "workstation," a "server," a "laptop," a "desktop," a "hand-held device," a "mobile device," a "tablet computer," or other computing devices, as would be understood by those of skill in the art. Given that the computing device 500 is depicted for illustrative purposes, embodiments of the present disclosure may utilize any number of computing devices 500 in any number of different ways to implement a single embodiment of the present disclosure. Accordingly, embodiments of the present disclosure are not limited to a single computing device 500, as would be appreciated by one with skill in the art, nor are they limited to a single type of implementation or configuration of the example computing device 500.

The computing device 500 can include a bus 510 that can be coupled to one or more of the following illustrative components, directly or indirectly: a memory 512, one or more processors 514, one or more presentation components 516, input/output ports 518, input/output components 520, and a power supply 524. One of skill in the art will appreciate that the bus 510 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 7 is merely illustrative of an exemplary computing device that can be used to implement one or more embodiments of the present disclosure, and in no way limits the disclosure.

The computing device 500 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices that can be used to encode information and can be accessed by the computing device 500.

The memory 512 can include computer-storage media in the form of volatile and/or nonvolatile memory. The memory 512 may be removable, non-removable, or any combination thereof. Exemplary hardware devices are devices such as hard drives, solid-state memory, optical-disc drives, and the like. The computing device 500 can include one or more processors that read data from components such as the memory 512, the various I/O components 516, etc. Presentation component(s) 516 present data indications to a user or other device. Exemplary presentation components include a display device, speaker, printing component, vibrating component, etc.

The I/O ports 518 can enable the computing device 500 to be logically coupled to other devices, such as I/O components 520. Some of the I/O components 520 can be built into the computing device 500. Examples of such I/O components 520 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the disclosure. It is intended that the present disclosure be limited only to the extent required by the appended claims and the applicable rules of law.

It is also to be understood that the following claims are to cover all generic and specific features of the disclosure described herein, and all statements of the scope of the disclosure which, as a matter of language, might be said to fall therebetween.

What is claimed is:

1. A method for monitoring one or more items on a grill, the method comprising:
    receiving, by at least one sensor device, captured data related to one or more items located on a grill;
    performing, by at least one computing device, analysis on the captured data including processing, by an object tracking algorithm, to determine movement of the one or more items located on the grill, and to calculate a duration that each of the one or more items is located on the grill based on the movement of the one or more items;
    generating, by the at least one computing device, one or more notifications or triggers based on the analysis, wherein the one or more notifications is generated if the duration of a respective item located on the grill exceeds a predefined time duration; and
    outputting, by the at least one computing device, the one or more notifications or triggers.

2. The method of claim 1, wherein the at least one sensor device is a camera.

3. The method of claim 2, wherein the analysis on the captured data comprises implementing a convolutional neural network configured to detect an item of interest from the one or more items.

4. The method of claim 3, wherein the analysis on the captured data further comprises associating metadata with an identification and location for the item of interest.

5. The method of claim 4, wherein the analysis on the captured data further comprises:
    tagging the item of interest with a universally unique identifier for tracking.

6. The method of claim 5, wherein the analysis on the captured data further comprises recording metadata state changes for the item of interest over time.

7. The method of claim 1, wherein the analysis on the captured data further comprises determining an inventory quantity of a specific good is too high/low and generating by the at least one computing device a trigger to adjust a future order of the specific good as a function of the determination of the inventory quantity of the specific good.

8. The method of claim 1, wherein the analysis on the captured data further comprises determining whether the one or more items are safe for a consumer based on the movement of the one or more items and generating by the at least one computing device a trigger related to a safety related protocol.

9. The method of claim 1, wherein the analysis on the captured data further comprises determining whether the one or more items has been tended to a sufficient amount of times based on the movement of the one or more items and generating by the at least one computing device a notification to tend to the one or more items.

10. A system of monitoring one or more items on a grill, the system comprising:
    a grill top;

at least one monitoring sensor device configured to capture data and transmit captured data about one or more items on a grill top;

a local computing device configured to receive the captured data from the at least one monitoring sensor device; and a remote cloud computing device to receive data from the local computing device;

wherein at least one of the local computing device and the remote cloud computing device perform analysis on the captured data including processing, by an object tracking algorithm, to determine movement of the one or more items located on a grill and calculating a duration that each of the one or more items is located on the grill based on the movement of the one or more items, and generate one or more notifications or triggers based on the analysis, wherein the one or more notifications is generated if the duration of a respective item located on the grill exceeds a predefined time duration.

11. The system of claim 10, wherein the grill top is a roller grill with a sneeze guard.

12. The system of claim 11, wherein the at least one monitoring sensor device is a camera located on the sneeze guard above the grill top.

13. The system of claim 10, wherein the analysis on the captured data comprises implementing a convolutional neural network configured to detect an item of interest from the one or more items.

14. The system of claim 13, wherein the analysis on the captured data further comprises associating metadata with an identification for the item of interest.

15. The system of claim 14, wherein the analysis on the captured data further comprises:

tagging the item of interest with a universally unique identifier for tracking movement of the item of interest.

16. The system of claim 15, wherein the movement is tracked frame by frame by comparing adjacent images from the captured data.

17. The system of claim 15, wherein the analysis on the captured data further comprises recording metadata state changes for the item of interest over time.

18. The system of claim 10, wherein the analysis on the captured data comprises a plurality of data points including at least one of a relative pixel location of an item of interest, pixel representation of an item of interest, distance from an item of interest, and depth of item of interest.

19. The system of claim 10, wherein the analysis further comprises determining an inventory quantity of an item of interest is too high or low and generating a trigger to adjust a future order of the item of interest as a function of the determination of the inventory quantity of the item of interest.

20. The system of claim 10, wherein the analysis comprises determining at least one of monitor a number of items, type of items, physical location of items, temperature of items, physical movement of items, time of physical movement of items, color of items, dwell time of items in a single location, physical appearance items, safety related protocols, and whether the one or more items item is no longer detectable.

21. The system of claim 10, wherein the analysis on the captured data further comprises determining whether the one or more items are safe for a consumer based on the movement of the one or more items and generating a trigger related to a safety related protocol.

22. The system of claim 10, wherein the analysis on the captured data further comprises determining whether the one or more items has been tended to a sufficient amount of times based on the movement of the one or more items and generating a notification to tend to the one or more items.

23. A computer program product for providing advertisements, the computer program product comprising a non-transitory computer readable storage medium having program instructions, the program instructions being readable/executable by a computing device to cause the computing device to:

receive captured data related to one or more items located on a grill;

perform analysis on the captured data, including processing, by an object tracking algorithm, to calculate change in location and movement and tagging the one or more items located on a grill and to calculating a duration that each of the one or more items is located on the grill based on the movement of the one or more items;

generate one or more notifications or triggers based on the analysis, wherein the one or more notifications is generated if the duration of a respective item located on the grill exceeds a predefined time duration; and output the one or more notifications or triggers.

24. The computer program product of claim 23, wherein the analysis further comprises determining an inventory quantity of an item of interest is too high or low based on the movement of the one or more items and generating by the computing device a trigger to adjust a future order of the item as a function of the determination of the inventory quantity of the item.

25. The computer program product of claim 23, wherein the analysis on the captured data further comprises determining whether the one or more items are safe for a consumer based on the movement of the one or more items and generating by the computing device a trigger related to a safety related protocol.

26. The computer program product of claim 23, wherein the analysis on the captured data further comprises determining whether the one or more items has been tended to a sufficient amount of times based on the movement of the one or more items and generating by the computing device a notification to tend to the one or more items.

* * * * *